UNITED STATES PATENT OFFICE.

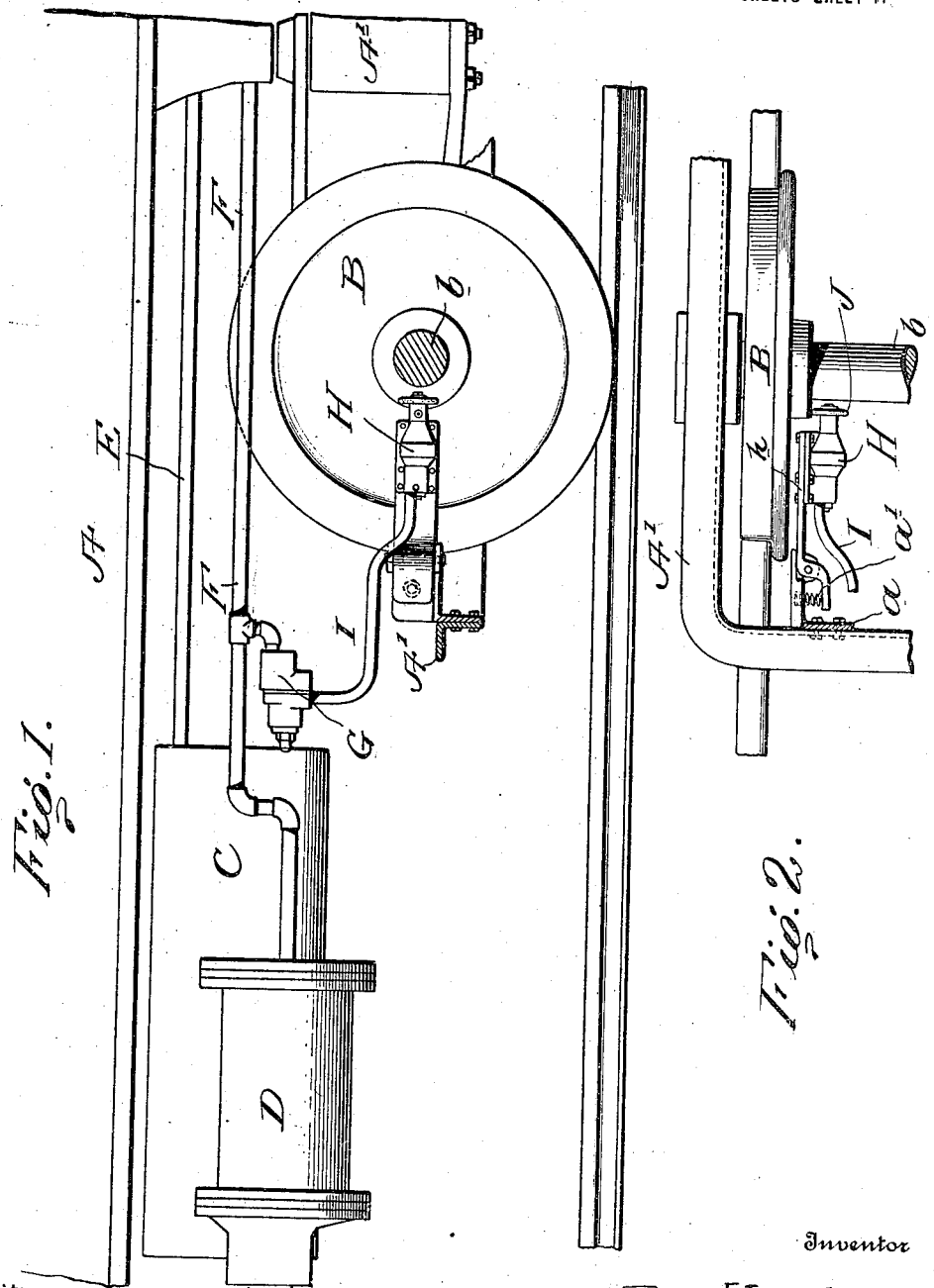

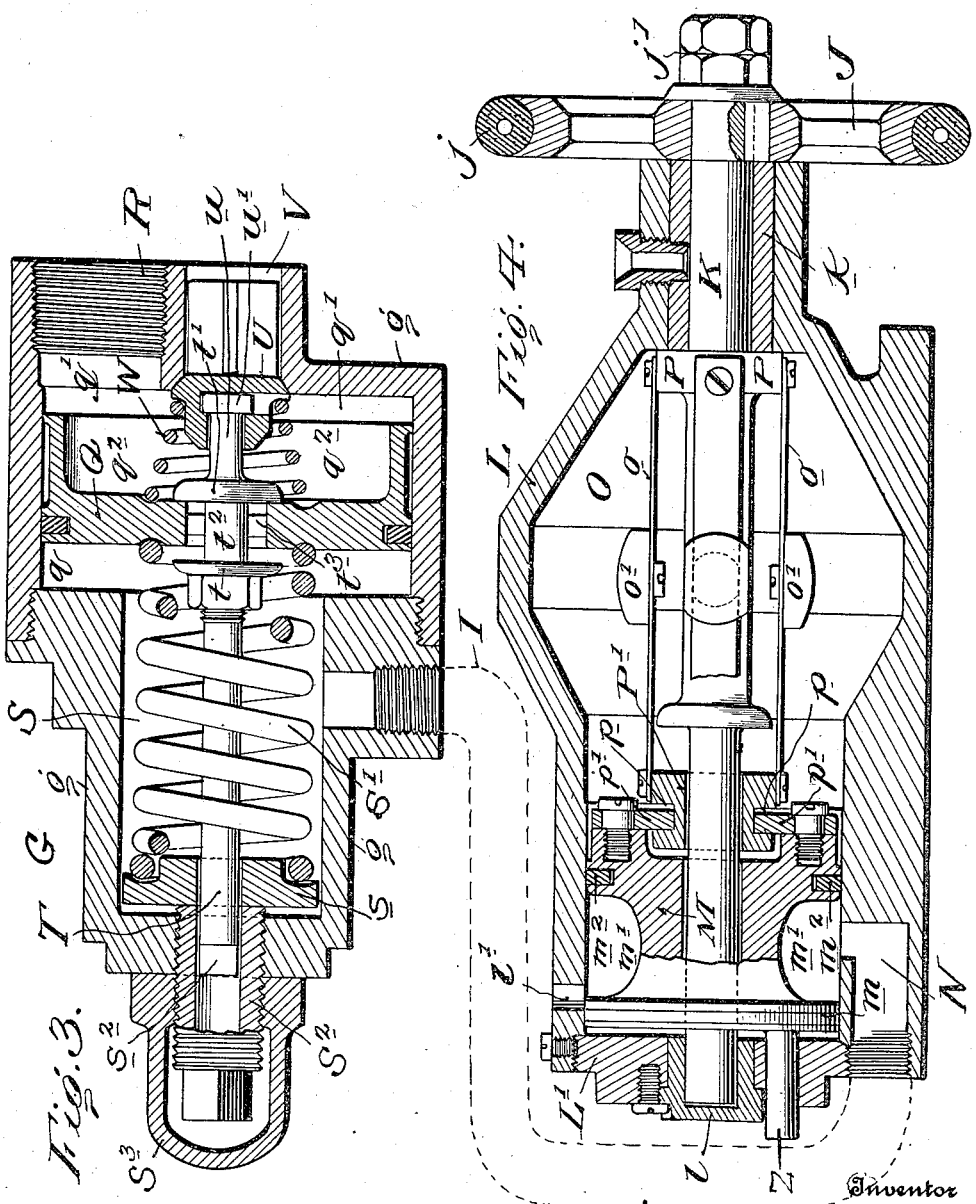

PERCY WARNER WILLIAMS, OF OGDEN, UTAH.

AIR-BRAKE.

1,194,585.      Specification of Letters Patent.      Patented Aug. 15, 1916.

Application filed August 5, 1915. Serial No. 43,852.

*To all whom it may concern:*

Be it known that I, PERCY W. WILLIAMS, a citizen of the United States, residing in Ogden, in the county of Weber and State of Utah, have invented certain new and useful Improvements in Air-Brakes, of which the following is a specification.

This invention relates to air brakes of the well known kind in which the brakes are operated by brake cylinders receiving compressed air from air reservoirs through brake valves. In an air brake system of this kind it often happens that the air pressure is so great as to apply the brakes so firmly that the wheels are held against rotation and are caused to slide on the tracks thus forming "flats" which are very objectionable. According to this invention I provide novel and efficient means whereby this is prevented, the organization, according to my invention, being such that when the pressure in the brake cylinders is so great as to stop the rotation of the car wheels to which the brakes are applied the air pressure will be automatically relieved or reduced.

In carrying out my invention I employ brake cylinders of the usual kind supplied with compressed air from suitable reservoirs through brake valves and I connect to the pipe leading from each brake valve to each brake cylinder a pressure reducing valve which is in turn connected with a governor valve having a part in frictional contact with a car wheel. The pressure reducing valve is so constructed that when the pressure is below a predetermined point it is inactive, but when the pressure rises above this point it opens and permits air to pass from the brake cylinder to the governor valve which, when the car wheel in connection with which it operates is rotating, is closed but which, when the pressure in the brake cylinder is so great as to stop said wheel, opens and relieves this pressure and thereafter the pressure is further relieved through an outlet port in the reducing valve as will be hereinafter described.

In the accompanying drawings, Figure 1 is a view in side elevation of so much of the mechanism of a car brake as is necessary to illustrate how my invention is applied. Fig. 2 is a detail plan view of part of this mechanism. Fig. 3 shows a longitudinal central section of the reducing valve. Fig. 4 is a similar view of the governor valve.

In Fig. 1 A indicates a car body, A' the car truck, B a car wheel, $b$ its axle, C a compressed air reservoir, D a brake cylinder, E a pipe leading from the reservoir to the brake valve, and F a pipe leading from the brake valve to the brake cylinder. These may all be of usual construction. In Fig. 1 the reducing valve is indicated at G and the governor valve at H, the two valves being connected by a flexible pipe or hose I, and the reducing valve being connected to the pipe F between the brake valve and the brake cylinder. The reducing valve may be supported by the pipe F and the governor valve may be supported as indicated in Fig. 2 by a plate $h$ hinged to a bracket $a$ secured to the truck frame. A spring $a'$ operates to hold the wheel J of the governor valve in frictional engagement with the car wheel.

The wheel J, which is provided with a rubber tire $j$, is keyed to the shaft K extending through a bearing sleeve $k$ in one end of a casing L and having a bearing at its opposite end in a recessed plug $l$ attached to the removable end or head L' of the casing. The wheel J is held in place on the shaft by nuts $j'$ and while the shaft is mounted to rotate it has no endwise movement.

Mounted to slide on the shaft K is a valve M which controls an escape port $l'$ leading from the interior of the casing to the atmosphere. This valve has a part $m$ for opening and closing the port $l'$ and an annular chamber $m'$ which receives air through the passage N which communicates by means of the hose I with the reducing valve G. The part $m$ on one side of the chamber $m'$ is suitably packed as shown and the valve is provided with packing $m^2$ on the opposite side of the chamber so that air entering this chamber is not allowed to escape except through the port $l'$.

The shaft K carries a centrifugal governor O comprising spring plates $o$ and weights $o'$. The weights are secured to the plates midway between their opposite ends and one end of each plate is attached to a collar P mounted on the shaft while the opposite end of each spring plate is attached to a collar P' mounted to slide on the shaft K and having an annular groove $p$ with which engage arms $p'$ attached to the inner end of the valve M. The arrangement is such that when the governor is at rest or revolving slowly the valve is in position to open the port $l'$, but when the governor is revolved at or beyond a predetermined speed, the valve will be drawn inward to close said port. It will be observed by reference to Figs. 1 and 2 that the wheel J is held in contact with the car wheel B. This engagement may be permanent or it may be effected whenever the brakes are applied. Mechanism for accomplishing this forms no part of my present invention and is not illustrated. A pin Z attached to the valve M extends through the head L' and serves to prevent the valve from turning and also as a means for sliding the valve by hand when desired. It also serves to indicate at all times the position of the valve in the casing.

The reducing valve G comprises a casing $g$ having a chamber comprising an inner part $q$ and an outer part $q'$ and containing a piston Q formed with a recess $q^2$ communicating with the part $q'$ of the chamber which part of the chamber communicates through a port R with the pipe F connecting the brake cylinder with the brake valve. The casing $g$ is also formed with a chamber S within which is arranged a spring S' which bears at one end against the inner side of the piston Q and at its outer end bears against a cap $s$ which is adjustable by means of a screw bolt $S^2$ working in the end of the casing and covered by a screw cap $S^3$ which serves as a lock nut.

A valve rod T extends axially through the spring S' and through a central opening in the cap $s$. One end of the rod which is squared at $s^2$ extends into a recess in the screw bolt $S^2$ and is free to slide therein. The opposite end of the rod is attached to a valve comprising two members $t$, $t'$ connected by a stem $t^2$ which extends through a central opening $t^3$ in the piston Q. The members $t$, $t'$ are larger in diameter than the opening $t^3$ and serve to control the passage of air from one chamber $q$, $q'$ to the other. The member $t'$ is attached to a valve stem $u$ connected by means of its head $u'$ with the recessed inner end of a valve U which controls an escape port V leading from the outer part $q'$ of the piston chamber to the atmosphere.

A spring W of lighter tension than the spring S' is interposed between the piston Q and the valve U and normally holds the valve U seated at which time the valve member $t'$ is also seated, but when the piston is moved inward to a sufficient extent it strikes the collar $t$ on the rod T, moves said rod endwise and unseats the valve U.

The spring S' should be of such power and should be so adjusted as to resist a predetermined pressure, say fifty pounds to the square inch, and thus cut off communication between the reducing valve and the governor valve. When the pressure in the brake cylinder is below this amount the piston Q will occupy the position shown in Fig. 3 and communication between the chambers $q$, $q'$ will be closed, but when the pressure increases the piston is moved inward and the valve $t'$ uncovers the opening $t^3$ thus allowing air to pass to the opposite side of the piston and fill the chambers $q$ and S. It also passes through the hose I to the governor valve and fills the chamber $m'$ of the valve M. If the port $l'$ is closed (as when the car wheel is revolving) the pressure on opposite sides of the piston Q is equalized and there is no escape of air to the atmosphere from either the reducing valve or the governor valve, but should the car wheel slow down or cease rotating the port $l'$ will be opened and air will escape from the governor valve and consequently the pressure in the chambers $q$ and S will be reduced and the excessive pressure on the outer side of the piston Q will cause it to move inward until it strikes the collar $t$, and by its further inward movement causes the valve U to open and permit the free escape of air through the port V. In this way the pressure in the brake cylinder is relieved and is so reduced that the pressure of the brake shoes is so lessened as to permit the wheels to again revolve. When the port $l'$ is open to the atmosphere air is released from the chambers $q$, S, much faster, say three times faster than it enters said chambers through the port $t^3$. When such is the case the pressure cannot equalize and the piston Q is moved to unseat the valve U as before described. When the pressure in the brake cylinder has been reduced to the predetermined amount (say fifty pounds) the valve U is closed and the further reduction of pressure thus prevented. When the brake pressure has been slightly reduced the car wheels are relieved and run more freely, braking power being nevertheless retained, and then the escape port $l'$ is closed and the escape of air from either the reducing valve or the governor valve is stopped, the pressure on the opposite sides of the piston Q being equalized and any amount of pressure will be retained until the car wheels again slow down or commence to slide when the port $l'$ will be again opened. In this way the sliding of the car wheels is prevented and the organization is such that service applications are effected when emergency applications are made because, when an emergency application is made in most cases a gripping or slipping action of the wheels on the rails is caused and the governor valve will be actuated in the manner before described and a continuous reduction of the pressure will be effected if necessary until the brakes are released. If, however, the wheels do not slip the governor valve will not be actuated and the reduction of pressure will not take place.

Experience has demonstrated that the reducing valve in my apparatus will reduce the pressure instantly as much as twenty or thirty pounds.

I claim as my invention:

1. The combination with a brake cylinder of a governor valve, and a pressure reducing valve comprising a casing having a piston chamber communicating with the brake cylinder and the governor valve, a piston within said chamber having a port through it, a valve controlling said port, a spring resisting the movement of the piston in one direction, means for opening said piston valve when the piston has moved to a certain extent, an air relief valve, and means operated by the piston for opening said relief valve.

2. The combination with a brake cylinder of a governor valve and a pressure reducing valve comprising a casing having a piston chamber communicating with the brake cylinder and the governor valve, a piston within said chamber having a port through it, a valve controlling said port, a relief valve, a spring interposed between the piston and the relief valve for holding said relief valve closed, a spring for pressing the piston toward the air entrance port and means operated by the piston against the pressure of said last mentioned spring for opening the piston valve and the air relief valve.

3. The combination with a brake cylinder and a governor valve provided with means for permitting the escape of air from it and for closing such air escape, of a pressure reducing valve comprising a casing having a piston chamber communicating with the brake cylinder and the governor valve, a piston within said chamber having a port through it, a valve controlling said port, a relief valve, a spring for pressing the piston toward the air entrance port, and means operated by the piston when the air escapes from the governor valve for opening the piston valve and the air relief valve.

4. The combination with a brake cylinder and a governor valve provided with means for permitting the escape of air from it and for closing such air escape, of a pressure reducing valve comprising a casing having a piston chamber, a piston therein having a port through it, a valve controlling said port, an air relief valve, a spring interposed between the piston and the relief valve for closing the latter, a spring resisting the movement of the piston in one direction, means operated by the piston for opening the piston valve and the air relief valve, and connections between the governor valve and the piston chamber of the reducing valve.

In testimony whereof, I have hereunto subscribed my name.

PERCY WARNER WILLIAMS.

Witnesses:
ROBERT C. NYE,
J. C. NYE.

Copies of this patent may be obtained for five cents each, by addressing the "Commissioner of Patents, Washington, D. C."